(12) United States Patent
Vanhala et al.

(10) Patent No.: US 8,693,154 B2
(45) Date of Patent: Apr. 8, 2014

(54) PROTECTION RELAY

(75) Inventors: Kari Vanhala, Vähäkyrö (FI); Petri Koivula, Laihia (FI)

(73) Assignee: ABB Technology AG, Zurich (CH)

( * ) Notice: Subject to any disclaimer, the term of this patent is extended or adjusted under 35 U.S.C. 154(b) by 49 days.

(21) Appl. No.: 13/415,915

(22) Filed: Mar. 9, 2012

(65) Prior Publication Data
US 2012/0236452 A1    Sep. 20, 2012

(30) Foreign Application Priority Data

Mar. 15, 2011   (EP) .................................... 11158280

(51) Int. Cl.
*H02H 3/00*    (2006.01)
(52) U.S. Cl.
USPC ......................................................... 361/78
(58) Field of Classification Search
USPC ......................................................... 361/78
See application file for complete search history.

(56) References Cited

U.S. PATENT DOCUMENTS

| | | | |
|---|---|---|---|
| 4,318,151 A * | 3/1982 | Balchin ........................... | 361/45 |
| 5,701,070 A | 12/1997 | Schultz | |
| 5,987,393 A | 11/1999 | Stinson | |
| 6,172,862 B1 * | 1/2001 | Jonnatti et al. ................... | 361/78 |
| 7,102,866 B2 * | 9/2006 | Bo .................................... | 361/81 |
| 8,200,372 B2 * | 6/2012 | Joos et al. ....................... | 700/292 |
| 8,249,755 B2 * | 8/2012 | Bright ........................... | 700/292 |
| 2006/0077605 A1 * | 4/2006 | Folkers et al. .................. | 361/92 |
| 2010/0309596 A1 | 12/2010 | Ylinen et al. | |
| 2011/0295529 A1 | 12/2011 | Vanhala et al. | |

FOREIGN PATENT DOCUMENTS

| | | |
|---|---|---|
| WO | WO 2009/080865 A1 | 7/2009 |
| WO | WO 2010/079256 A1 | 7/2010 |

OTHER PUBLICATIONS

European Search Report for EP 11158280 dated Aug. 19, 2011.

* cited by examiner

*Primary Examiner* — Scott Bauer
(74) *Attorney, Agent, or Firm* — Buchanan Ingersoll & Rooney PC

(57) ABSTRACT

A protection relay for protecting an electric system, includes means a manner of a time multiplier value, a manner of calculating, with the received time multiplier value, and an inverse definite time dependency having an exponentiation function. The dependency defines a relationship between an excitation level of an input signal to the relay and an operating time of the relay. The relay further a manner of shifting the dependency to a predefined calculation space, and includes a manner of applying, during execution, the dependency shifted to the predefined calculation space when determining an operating condition of the relay.

16 Claims, 3 Drawing Sheets

PROTECTION RELAY

RELATED APPLICATION(S)

This application claims priority under 35 U.S.C. §119 to European Patent Application No. 11158280.5 filed in Europe on Mar. 15, 2011, the entire content of which is hereby incorporated by reference in its entirety.

FIELD

The present disclosure relates to a protection relay, such as, the calculation of an operating condition in a relay.

BACKGROUND INFORMATION

Over-excitation protection is used to protect generators and power transformers against excessive flux density and saturation of magnetic core. The function calculates U/f ratio (Volts/Hertz) proportional to excitation level of generator or transformer and compares this value to the setting limit. The function starts when the excitation level exceeds a set limit and operates when a set operating time has then elapsed. The operating time characteristic can be selected to be either definite time (DT) or over-excitation inverse definite minimum time (over-excitation type IDMT).

Protection relay manufacturers have modeled the over-excitation IDMT characteristics by using several base equations. One of the presented base equations for the IDMT curve is as follows:

$$t(s) = 60 * e^{\left(\frac{ak+b-100M}{c}\right)} \quad (1)$$

t(s) the operating time in seconds

M the excitation level ('U/f ratio' or 'Volts/Hertz') in per unit (p.u.) value k time multiplier Inherently this thermal model equation gives result as minutes. The constant '60' in Equation 1 converts the time from minutes to seconds. The curve parameters a, b and c can be constants defined by the vendor. The vendor may provide several curves, which have mutually different constant values a, b and c or these parameters can be settable by the user. As an example, a may be 2.50, b may be 115.00 and c may be 4.886. Generally, Equation 1 represents a known thermal model mathematically defined by a base equation, where the base value is the natural base e≈2.7182818285. These kinds of equations where the base number exceeds unity, inherently grow very rapidly due to the increasing exponent.

Operating time can be calculated directly from equation by integration, where cumulated integral values comprises (e.g., consists of) successive 1/t-values calculated from Equation 1 inverses. This widely used method is inherently prone to accuracy problems during integration due to high denominator values resulting to integral sum components close to zero.

If we can assume parameters a, b and c to be vendor defined, and by this way manageable (i.e., we can guarantee curve characteristics depending on these parameters already before hand), the problematic parameters in Equation 1 are the user-settable parameter k and equation variable M. Frequently, the value of the user-settable k value has been limited severely. For instance, some vendors allow only k values that are between 1 and 9.

In the known calculation method, the successive 1/t values are beforehand calculated to look-up-table (LUT) and are integrated to an integral sum. If the values are close to zero, calculation inaccuracy problems are caused when there is some variation in input signal magnitude (here M) level, because an integral component almost zero will be incremented to a remarkably larger cumulated integral sum. Another drawback in the known method, if no beforehand calculated LUT is used, is the need of a long division calculation operation in every task cycle. Both these two drawbacks (successive execution period divisions and cumulation inaccuracy) can be replaced by a multiplication and comparison method disclosed in WO 2009/080865.

However, in some application environments, it would be preferable to allow greater values for k, up to 100 or even more. With high k values together with low or modest M values the base equation value increases rapidly. Consequently, this leads to substantially long protection operating times.

More problems may also arise if the parameters a, b and c are user-settable in Equation 1. While technology and customer needs are progressing in the future there will surely be more demands regarding parameter flexibility. The parameter value combination may be such that the calculation of the equation becomes computationally highly time consuming.

Parameter value ranges should be successfully restricted by a vendor so that equation can reach only manageable and pre-estimated values. It has to be guaranteed that all possible parameter combinations lead to a correctly calculated operating time, i.e. base equation result can never grow beyond computational limits so that no processor overflow occurs.

SUMMARY

An exemplary protection relay for protecting an electric system is disclosed, comprising: a receiver configured to receive a time multiplier value; a calculator configured to calculate, with the received time multiplier value, an inverse definite time dependency having an exponentiation function, wherein the dependency defines a relationship between an excitation level of an input signal to the relay and an operating time of the relay; a shifter configured to shift the dependency to a predefined calculation space; and an applier configured to apply, during execution, the dependency shifted to the predefined calculation space when determining an operating condition of the relay.

An exemplary protection relay for protecting an electric system, is disclosed comprising: means for receiving a time multiplier value; means for calculating, with the received time multiplier value, an inverse definite time dependency having an exponentiation function, wherein the dependency defines a relationship between an excitation level of an input signal to the relay and an operating time of the relay; means for shifting the dependency to a predefined calculation space; and means for applying, during execution, the dependency shifted to the predefined calculation space when determining an operating condition of the relay.

An exemplary computer program product is disclosed including a computer usable medium having a computer readable program code recorded therein, wherein when said computer program product is in communicative contact with a processor, the program coded causing the processor to execute the steps of: receiving a time multiplier value; calculating, with the received time multiplier value, an inverse definite time dependency having an exponentiation function wherein the dependency defines a relationship between an excitation level of an input signal to the relay and an operating time of the relay; shifting the dependency to a predefined calculation space; and applying, during execution, the dependency shifted to the predefined calculation space when determining an operating condition of the relay.

BRIEF DESCRIPTION OF THE DRAWINGS

In the following the disclosure will be described in greater detail by means of exemplary embodiments with reference to the attached [accompanying] drawings, in which.

DETAILED DESCRIPTION

An object of the present disclosure is to provide a method and an apparatus for implementing the method so as to alleviate the above disadvantages. The object of the disclosure is achieved by a method and an arrangement, which are defined in the independent claims. Some embodiments of the disclosure are disclosed in the dependent claims.

Exemplary embodiments of the present disclosure relate to thermal protection relays, which provide protection against thermal heating, for an electric device, such as a motor, generator and transformer over excitation, for instance.

The relay applies an IDMT principle discussed above. The general IDMT operation depends on the input signal magnitude proportional to a set start value. Alternatively operation can also depend on pure signal magnitude value like over excitation example given above. However, in that case operation start depends directly on set start value and IDMT operation takes place only when set start value is exceeded (over function) or undershoot (under function). For over function, when signal magnitude is high, that is the input measure exceeds the set limit clearly (being 2 or 3 times the excitation limit, for instance) the operating time is short. When the over excitation is low being 1.1 or just above 1.0 depending on the device measurement accuracy, the operating time is longer. Generally, IDMT operating time is inversely proportional to the signal magnitude.

Figure 1:
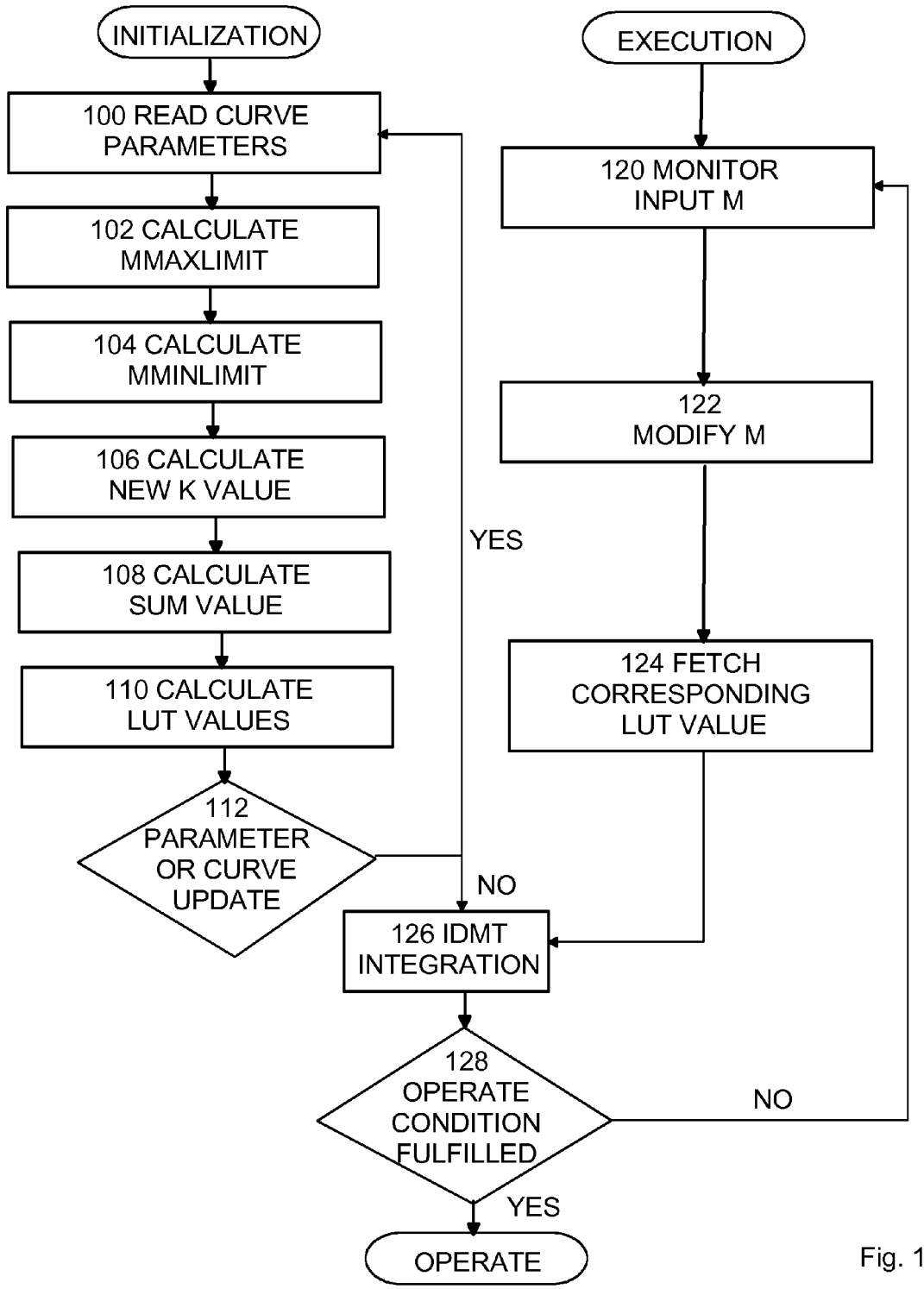
FIG. 1 is a flow chart of a method of protecting an electrical system in accordance with an exemplary embodiment of the present disclosure.

FIG. 1 is a flow chart of a method of protecting an electrical system in accordance with an exemplary embodiment of the present disclosure. FIG. 1 shows one embodiment of a method. As a starting point, it is assumed that a thermal protection model having an exponential term is applied to the protection relay, that is, the model is an exponentiation function. In an exemplary embodiment, the function is an exponential function having a base number e. One example of the exponential function is given in Equation 1.

In FIG. 1, the blocks 100 to 112 depict an initialization phase/state of the relay including the steps that are carried out when the relay is powered up. When the relay has been initialized, the relay may be taken into functional use depicted by the continuous steps following step 120.

The initialization starts with reading 100 of the curve parameters. The curve parameters may include parameters a, b and c as shown in Equation 1. These parameters may be fixed, that is they have been set by the vendor of the relay and cannot be changed by the user. Alternatively, they may be user settable.

In 100, also the user settable time multiplier k value is read. The allowable k range is here assumed to be from 0.1 to about 100. The upper limit can be something else than 100, but preferably over the known value, such as about 10. The upper limit can here be 15, 20, 30, 50, 75, 100 or 150, for instance. The lower limit can be smaller than 0.1 and can start even from zero (0).

In 100, the maximum and minimum operating time limits are also read. These operating times may be fixed and system specific or they may be user settable. The maximum operating time can be set to 10,000 seconds (2.8 hours), for instance. This maximum operating time limit becomes applicable when the over excitation is (very) low. The minimum operating time may also be set by the user or it can be fixed by the system to 0.2 s, for instance. The minimum operating time may also depend on some system-specific limitation. For example, if the execution cycle length is 10 ms, the minimum operating time can only be equal or greater than the cycle time.

In an exemplary embodiment disclosed herein, to calculate the operating time more accurately, some margin may be defined to both of the defined limits in order to allow some signal (and M value) variation in the vicinity of M-values resulting to the maximum or minimum operating times.

To achieve this, the set maximum operating time may be increased, and the set minimum operating time may be decreased for calculations. The margin values depend on the curve slope. For example, in FIG. 2, the curves are drawn in semilog coordinates and the margin time of 5000 seconds for original MaxOperateTime of 10,000 seconds means only about 0.01 decrease of M-value. The margin time of 100 milliseconds for original MinOperateTime of 200 milliseconds means only about 0.073 increase of M-value. In the following MaxOperateTime and MinOperateTime to be used in the calculations are defined as "set MaxOperateTime+margin" and "set MinOperateTime−margin", respectively.

In 102, the M value on the given curve corresponding to the set maximum operating time (margin included) is calculated. MMinLimit is calculated from Equation 2, which has been derived by solving M from Equation 1. MMinLimit is the smallest M value used in the calculations. In an embodiment, it corresponds to the first index in the LUT.

$$MMinLimit = \left(k*a + b - c*\ln\left(\frac{MaxOperateTime}{60}\right)\right)/100 \quad (2)$$

In 106, the M value corresponding to the minimum operating time (margin included) is calculated from Equation 3, which equation has been obtained by solving M from Equation 1. MMaxLimit refers to the greatest M value used in the calculations, and the greater M values are saturated to MMaxLimit. MMaxLimit corresponds to the maximum/last LUT index value.

$$MMaxLimit = \left(k*a + b - c*\ln\left(\frac{MinOperateTime}{60}\right)\right)/100 \quad (3)$$

The following steps 106 to 110 relate to shifting of the curve such that the calculations during execution become simple, efficient and value-restrictive. The principle in the curve shifting is that the shifted curve intersects the maximum operate time with M value 1.

At first, in 106, a new k value representing the shifted curve is calculated. This means that the user has initially given a time multiplier k value, but this needs to be modified. The time multiplier is calculated by Equation 4:

$$NewkValue = \frac{100*1 - b + c*\ln\left(\frac{MaxOperateTime}{60}\right)}{a} \quad (4)$$

This Equation 4 has been obtained by setting M to 1 in Equation 1 and solving k.

In 108, a sum value to be used in execution time calculations is calculated. The sum value relates to the integration of the model based on Equation 1 cumulative integral sums. In an exemplary embodiment, Equation 1, and the operating condition thereof, may be implemented by comparing two cumulative integral sums, where there are a linearly increasing sum term and an exponentially increasing sum term. This linear sum term can be modeled by Equation 5 being a fixed value term.

$$sumValue = 60*\exp\left(\frac{a*NewkValue}{c}\right)*\frac{1}{taskTime} \quad (5)$$

In 110, a look up table (LUT) is populated, which values are used during the execution. The LUT is populated, from the shifted curve, with values between M=1 and the shifted lower point of the curve corresponding to MMaxLimit in the shifted curve.

When the curve has been shifted in step 108, the look-up table can be populated in 110 by using Equation 6:

$$LutValue = \exp\left(\frac{100*M - b}{c}\right) \quad (6)$$

When populating the look-up table, M goes from value 1 to (MMaxLimit-MMinLimit)+1. The look-up table may have a step size optimized based on the system memory capacity and needed calculation accuracy. Step size of $2^{-14}$ can be used, for instance. The look-up table thus contains, for each entry, an index and a look-up table value calculated from Equation 6.

In an embodiment, the LUT is implemented by having there all values between [M=1, M=1+(MMaxLimit-MMinLimit)/step size] with a given step size. However, there are also alternative ways to implement effective LUT for example by introducing LUT-values only between some small integer range, and then calculate larger values during execution using exponent function arithmetics.

When the original curve is shifted, a new dependency is formed. The LUT is populated with values corresponding to the new dependency. In this way, the calculations that are to be applied during execution can be carried out in a predefined calculation space. The predefined calculation space is the LUT, where the values are computationally restricted thereby speeding up the execution, improving calculation accuracy, and avoiding the risk of calculation overflow.

After initialization in steps 100 to 110, the protection function may be taken into use disclosed in the usage steps 120 to 128.

In 120, the relay monitors an input signal, which is representative of the signal level in the electric system which is to be protected by the relay. The input signal may be representative current or voltage level or a derivative of those signals in the electric system, for instance. The input signal may be sampled by a sampling frequency, which may be 1600 Hz and monitored by an execution cycle interval of the relay, which may be 2,5 ms, for instance.

In 122 the signal value, such as current value, is compared to the set over current start level. M is calculated by dividing the measured value with the setting value. The obtained M value is then modified. The idea here is that M values which fall to the interval between MMinLimit and MMaxLimit obtain exact values from the look up table that now represents the shifted curve. Other values undershooting or exceeding these limit values are replaced with either of these two values MMinLimit/MMaxLimit, i.e. LUT index is saturated to one of these extreme values.

This idea may be highlighted by the pseudo code of Equation 7.

if ($M > M$MaxLim) {                    Eq. (7)

$M = M$MaxLim $- M$MinLim$+ 1$;

} else { if ($(M - M$MinLim$) > 0$) {

$M = M - M$MinLim$+ 1$;

} else $M = 1$;

}

The first condition above forces M to be no more than MMaxLimit. The second condition handles with M values that fall between the minimum and maximum values. The last condition handles cases where the M value is under the MMinLimit.

In 124, when the M value has been solved, the corresponding LUT-index can be calculated and value represented by this index is read from the LUT.

In 126, IDMT integration is done by using simplified Equations 8 and 9, where cumCounter is counter starting from zero and increasing by one every task cycle when function is run. Simplified Equations 8 and 9 imply that no initial delay, such as operate delay compensation due to system measurement delays and output relay delay is needed to be taken into account in operate time calculation.

$$it1 = \text{cumCounter} * \Sigma LutValue \quad (8)$$

$$it2 = \text{cumCounter} * sumValue \quad (9)$$

In 128, the operating condition is checked. The operating condition is fulfilled if it1>it2. If the operating condition is not fulfilled, the method returns to step 120 and monitoring of the new input signal.

During execution, the user of the device may decide to change the parameters, either the operation time thresholds (max/min) or start value or the curve parameters a/b/c/k, which is highlighted by step 112. Depending on the change, different actions may be taken.

For example, if time multiplier is changed, Equations 2 and 3 are recalculated. If maximum operating time is changed, Equations 2, 4 and 5 are recalculated. If minimum operating time is changed, Equation 3 is recalculated. If function start level is changed during function start, then it depends on the protection philosophy how to react.

Figure 2:
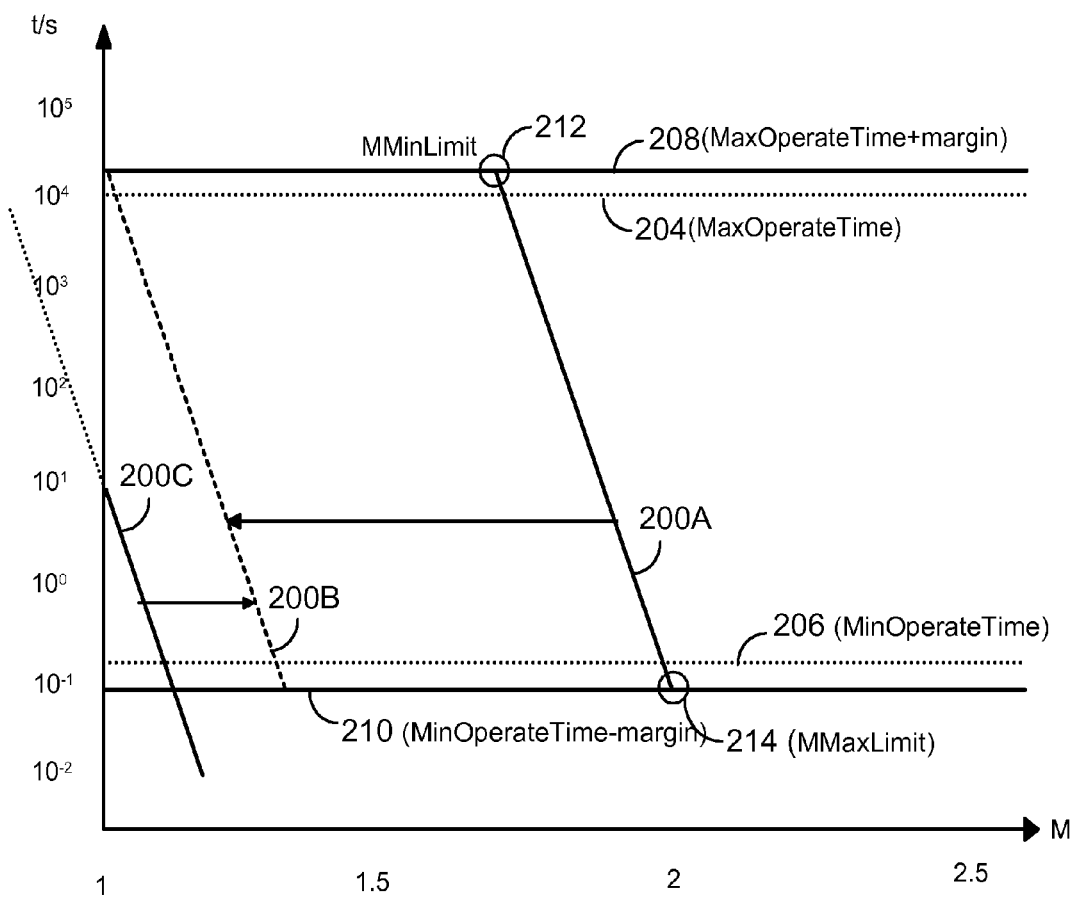
FIG. 2 shows shifting of a characteristic curve of a relay in accordance with an exemplary embodiment.

FIG. 2 shows shifting of a characteristic curve of a relay in accordance with an exemplary embodiment. In the coordinate axis of FIG. 2, the linear x-axis depicts the over-excitation compared to a set excitation level or alternatively it can also represent absolute over excitation level, too. The logarithmic y-axis depicts the operate time as a function of the over-excitation level. The solid line curve 200A depicts the curve, which is based on the user selection of time multiplier k and other corresponding curve parameters. When read from the curve 200A, a constant over excitation 1.75 would result into an operation time of approximately 1000 seconds, for instance.

The user-defined values for the maximum operating time (10,000 s and minimum operating time (0.02 s levels are shown with 204 and 206, respectively. When the margins are added to the curves, the upper limit becomes 15000 s and is depicted with the level 208. The lower limit becomes 0.01 s with margin and is illustrated with level 210.

MMinLimit 212 corresponds to the intersection point of the curve 200A and the level MaxOperateTime+margin 208. Correspondingly, MMaxLimit 214 corresponds to the intersection point of the curve 200A and the MinOperateTime-margin 210.

In FIG. 2, the curve 200A is shifted horizontally to left to a position 200B. The position of the curve 200B is defined so that the intersection point of the curve 200B and the MaxOperateTime+margin 208 occurs with M=1.

Figure 3:
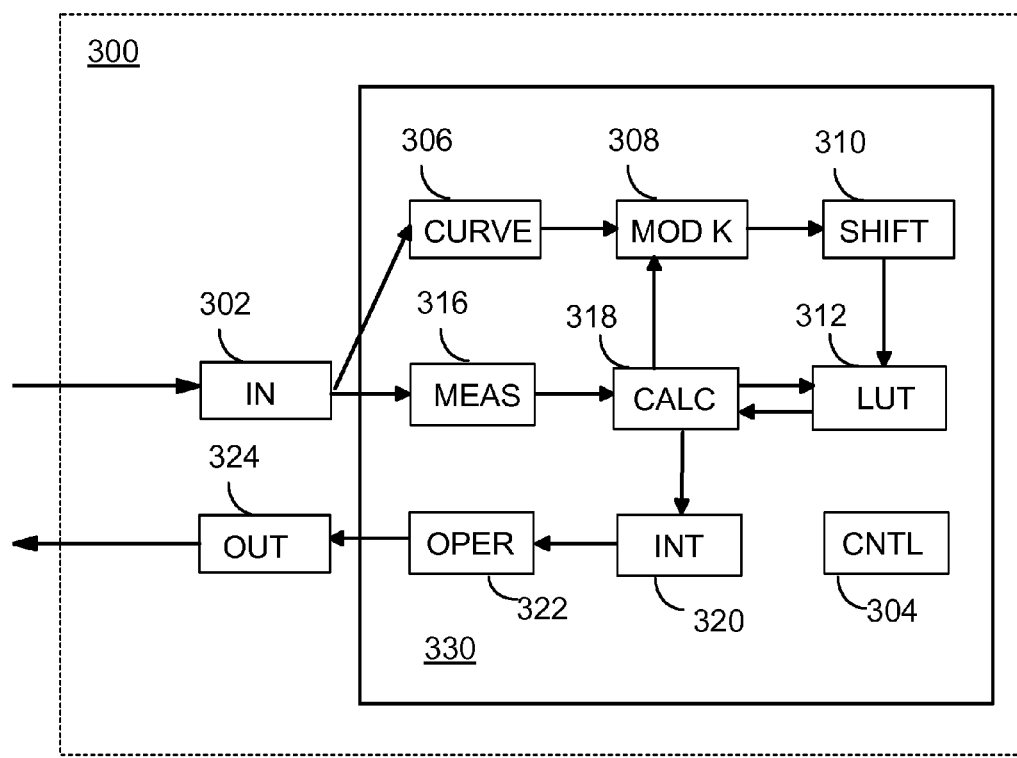
FIG. 3 shows one a relay in accordance with an exemplary embodiment.

FIG. 2 shows also another curve 200C on the left side of 200B, which can be shifted to the right to the position of 200B. Because over excitation start criteria is checked against original M value before modification, it is not allowed that original M values below unity result to IDMT integration sum increase. In case of M undershooting unity IDMT function is assumed to be in drop-off. Furthermore, if M is independent of start value and measured M undershoots start value, function has either not yet started or it is in drop-off. FIG. 3 shows an embodiment of a relay 300. The relay may be an over voltage, under voltage, over current, or under current relay, for instance, or may be function on the basis of frequency, temperature, power, energy, pressure or some derivates of those. The relay 300 includes a fixed-point or a floating point processor, that is, a processor applying fixed/floating-point arithmetic.

The relay includes an input port 302 for inputting an input measure, such as current, voltage or frequency. The input 302 includes also the user interface and the functions that relate to user input parameters. The relay also includes an output port 324 for outputting a control signal such as a control signal for cutting the electricity feed in the event of fulfilment of the tripping condition in the relay 300. Another use of the output port 324 is to indicate STARTUP for external needs. The relay also includes a processor denoted with 330.

The processor 330 includes a control unit 304 for controlling and coordinating the operation of the processor. The execution/task cycle of the processor may be 2.5 ms, for instance.

The relay 300 includes both functionality, which is needed during initialization and also functionality that is used during execution. Blocks 306 to 314 relate to the initialization stage. When the relay is powered up, the curve processing block 306 reads curve parameters. The relay applies a calculation model, which has an exponent function. The calculation model applies one or more curve parameters, which in Equation 1 are referred to by a, b and c. The calculation model also applies a user-settable time multiplier k, which is also read at this stage. Based on the curve parameters and the time multiplier value, the relay can form an IDMT dependency to be applied in the operation of the relay. In a lin-log coordinate axis, the dependency is a straight. The block 306 also applies the upper and lower limits of the operation time to limit the curve between the limits.

The relay includes also a time multiplier k modification block 308. The new k value is calculated such that the formed curve can be moved to a predetermined calculation space. The predetermined calculation space can be such that the upper point of the limited curve falls to excitation value 1.

The shifting unit 310 carries out the actual shifting of the curve. The M value at the upper limit is 1, and the M value at the lower limit depends on the steepness of the curve. The LUT 312 is populated with the M values between the M values 1 and the M value at the lower limit.

The processor further includes a measuring unit 316 for measuring the input signal, performing an analogue-to-digital conversion and determining the level of the input signal. The calculating unit 318 compares the input signal to a predetermined threshold value and forms an execution level value. If the measured level exceeds the setting value, over excitation occurs and function starts. Furthermore, unit 318 modifies measured level for LUT adjustment.

During execution, the calculation unit 318 reads a LUT value corresponding to the execution level and passes it to an integration unit 320. The operation condition checking unit 322 checks if the integration unit value fulfils the operate condition. If it does, an operate signal is output to the output port 324.

The units on the processor 320 may be implemented by means of a computer program (software) or hardware or a combination thereof. In addition to a microprocessor, the relay comprises also a memory for storing the software any parameters needed in the calculations thereon. It will be obvious to a person skilled in the art that, as the technology advances, the inventive concept can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A protection relay for protecting an electric system, comprising:
   a receiver configured to receive a time multiplier value;
   a calculator configured to calculate, with the received time multiplier value, an inverse definite time dependency having an exponentiation function, wherein the dependency defines a relationship between an excitation level of an input signal to the relay and an operating time of the relay;
   a shifter configured to shift the dependency to a predefined calculation space; and
   an applier configured to apply, during execution, the dependency shifted to the predefined calculation space when determining an operating condition of the relay.

2. The protection relay as claimed in claim 1, wherein the shifter is configured to shift the dependency to the predefined calculation space by calculating a new time multiplier value to define a new dependency; and
   the calculator is configured to calculate and store in a lookup table, calculation values representing the new dependency, which calculation values are calculated as a function of an excitation level.

3. The protection relay as claimed in claim 1, wherein the applier is configured to:

apply, during execution, a calculation value from the lookup table when an excitation level falls between the excitation levels applied in the lookup table;

apply a maximum calculation value of the lookup table when an excitation level during execution exceeds the maximum calculation value; and apply a minimum calculation value of the lookup table when an excitation level during execution undershoots the minimum calculation value.

4. The protection relay as claimed in claim 1, wherein:

the receiver is configured to receive a predefined maximum operating time limit for the relay, the calculator is configured to calculate an excitation level leading to the maximum operating time limit, and the shifter is configured to shift all the values of the dependency such that the excitation level, at which the maximum operating time setting limit is achieved, is moved to a predefined excitation value.

5. The protection relay as claimed in claim 1, wherein:

the receiver is configured to receive a predefined maximum operating time limit and/or a predetermined minimum operating time for the relay, the calculator is configured to add a margin to the maximum operating time and/or to the minimum operating time, and the calculator is configured to apply the maximum operating time and/or the minimum operating time, to which the margin has been added, when calculating calculation values to the lookup table.

6. The protection relay as claimed in claim 1, wherein the shifter is configured to:

identify an upper excitation level and a lower excitation level of the dependency;

shift the dependency between the upper excitation level and the lower excitation level; and the calculator is configured to calculate, between the upper limit and the lower limit, a plurality of calculation values as a function of the excitation by applying a predetermined formula and store the plurality of values in an indexed look up table to be applied during execution of the relay.

7. The protection relay as claimed in claim 1, wherein the relay comprises:

a monitor configured to monitor an input signal during execution;

a determiner configured to determine an excitation level of the input signal;

a modifier configured to modify the excitation level determined from the measured input signal;

a fetcher configured to fetch a calculation value corresponding to the modified excitation level from a look up table;

a performer configured to perform an inverse definite time integration based on the calculation value and a predetermined fixed term; and a checker configured to check, based on the integration, if the operate condition of the relay is fulfilled.

8. The protection relay as claimed in claim 1, wherein the dependency is an exponential function.

9. The protection relay as claimed in claim 1, wherein the dependency can be modelled as a straight in a linear-logarithmic space, wherein the linear x-axis depicts an excitation level and the logarithmic y-axis the operating time of the relay.

10. The protection relay as claimed in claim 1, wherein the time multiplier value is at least 10.

11. The method of protecting an electric system, comprising:

receiving a time multiplier value;

calculating, with the received time multiplier value, an inverse definite time dependency having an exponentiation function wherein the dependency defines a relationship between an excitation level of an input signal to the relay and an operating time of the relay, shifting the dependency to a predefined calculation space; and applying, during execution, the dependency shifted to the predefined calculation space when determining an operating condition of the relay.

12. The method as claimed in claim 11, wherein the method comprises:

identifying an upper excitation level and a lower excitation level of the dependency;

calculating, between the upper limit and the lower limit, a plurality of calculation values as a function of the excitation by applying a predetermined formula; and storing the plurality of values in an indexed look up table to be applied during execution of the relay.

13. The method as claimed in claim 11, wherein the method comprises:

receiving a predefined maximum operating time limit for the relay;

adding a margin to the maximum operating time; and applying the maximum operating time, to which the margin has been added, when calculating calculation values to the lookup table.

14. The method as claimed in claim 11, wherein the method comprises:

monitoring an input signal during execution;

determining an excitation level of the input signal;

modifying the excitation level determined from the measured input signal;

fetching a calculation value corresponding to the modified excitation level from a look up table;

performing inverse definite time integration based on the fetched calculation value and a predefined fixed term; and checking, based on the integration, if the operating condition is fulfilled.

15. A protection relay for protecting an electric system, comprising:

means for receiving a time multiplier value;

means for calculating, with the received time multiplier value, an inverse definite time dependency having an exponentiation function, wherein the dependency defines a relationship between an excitation level of an input signal to the relay and an operating time of the relay;

means for shifting the dependency to a predefined calculation space; and means for applying, during execution, the dependency shifted to the predefined calculation space when determining an operating condition of the relay.

16. A non-transitory computer program product includes a computer usable medium having a computer readable program code recorded therein, wherein when said computer program product is in communicative contact with a processor, the program code causing the processor to execute the steps of:

receiving a time multiplier value;

calculating, with the received time multiplier value, an inverse definite time dependency having an exponentiation function wherein the dependency defines a relationship between an excitation level of an input signal to the relay and an operating time of the relay;
shifting the dependency to a predefined calculation space; and
applying, during execution, the dependency shifted to the predefined calculation space when determining an operating condition of the relay.

\* \* \* \* \*